United States Patent [19]

Hoffman

[11] Patent Number: 4,977,002
[45] Date of Patent: * Dec. 11, 1990

[54] SYSTEM FOR APPLYING HEAT SHRINK FILM TO CONTAINERS AND OTHER ARTICLES AND HEAT SHRINKING THE SAME

[75] Inventor: Wolfgang Hoffman, Modesto, Calif.

[73] Assignee: B & H Manufacturing Company, Inc., Ceres, Calif.

[*] Notice: The portion of the term of this patent subsequent to Jul. 4, 2006 has been disclaimed.

[21] Appl. No.: 334,093

[22] Filed: Apr. 5, 1989

Related U.S. Application Data

[63] Continuation of Ser. No. 89,582, Aug. 26, 1987, Pat. No. 4,844,957, which is a continuation of Ser. No. 886,192, Jul. 15, 1986, Pat. No. 4,704,173, which is a continuation of Ser. No. 601,919, Apr. 19, 1984, abandoned, which is a continuation of Ser. No. 382,374, May 27, 1982, abandoned.

[51] Int. Cl.⁵ ............................................ B65D 23/08
[52] U.S. Cl. .................... 428/34.7; 215/12.1; 428/34.9; 428/192; 428/347
[58] Field of Search ............ 428/34.7, 34.9, 192, 428/347, 913; 215/12.1

[56] References Cited

U.S. PATENT DOCUMENTS

| 3,235,433 | 2/1966 | Cyacho | 156/229 |
| 3,542,229 | 11/1970 | Beyerlein | 215/12 R |
| 3,604,584 | 7/1971 | Shanka | 156/86 |
| 3,659,394 | 5/1972 | Hartleig | 156/568 |
| 3,734,273 | 5/1973 | Watanabe | 206/46 FC |
| 4,108,710 | 8/1978 | Holfmann | 156/450 |
| 4,126,238 | 11/1978 | Rausing | 428/35 |

FOREIGN PATENT DOCUMENTS 1012406 6/1977 Canada.

Primary Examiner—James Seidleck
Attorney, Agent, or Firm—Flehr, Hohbach, Test, Albritton & Herbert

[57] ABSTRACT

Apparatus and method for applying heat shrinkable film to containers and other articles having a vertical body position, e.g., the cylindrical body of a container, and one or two re-entrant portions, e.g., a shoulder on a bottle. A segment of film is applied to the vertical surface without heat shrinking and with one or two end portions overlapping the re-entrant part of the article. Heat is applied to the overlap or overlaps to shrink them onto the article.

15 Claims, 2 Drawing Sheets

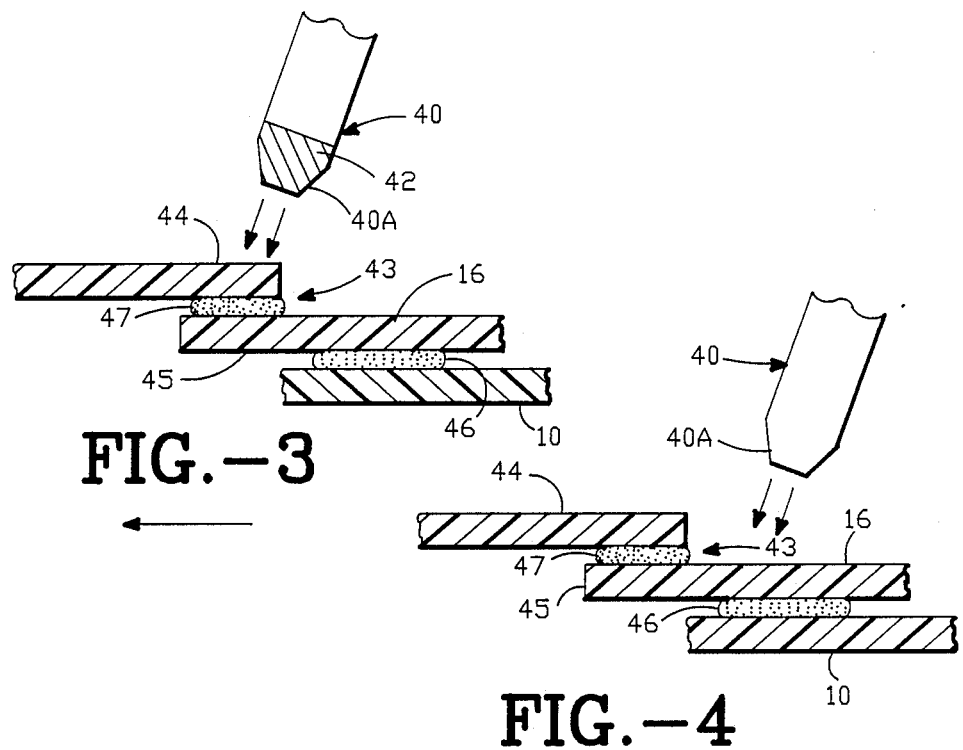
FIG.-3
FIG.-4
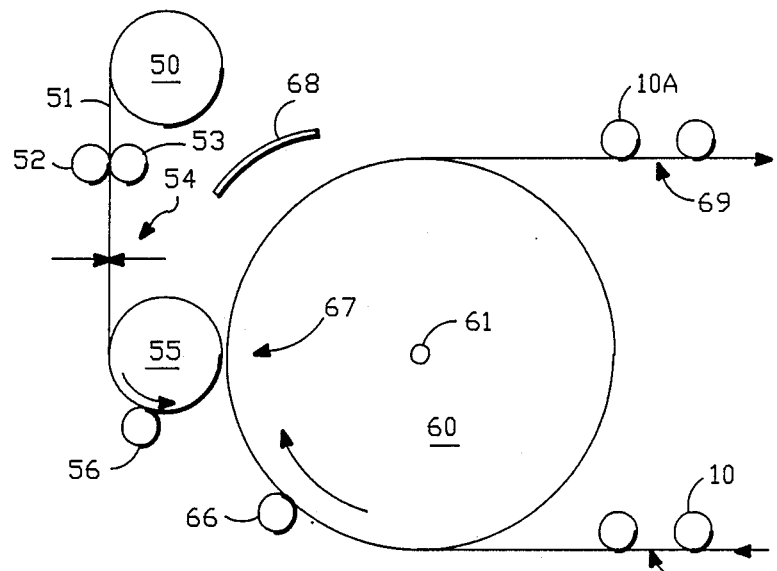
FIG.-5

SYSTEM FOR APPLYING HEAT SHRINK FILM TO CONTAINERS AND OTHER ARTICLES AND HEAT SHRINKING THE SAME

This is a continuation of co-pending application Ser. No. 07/089,582 filed on Aug. 26, 1987, now U.S. Pat. No. 4,844,957, which is a continuation of Ser. No. 886,192 filed Jul. 15, 1986 (now U.S. Pat. No. 4,704,173), which is a continuation of Ser. No. 601,919 filed Apr. 19, 1984, now abandoned, which is a continuation of Ser. No. 382,374 filed May 27, 1982 now abandoned.

This invention relates to method and apparatus and to a system for applying heat shrink film to containers and other articles.

More particularly, this invention relates to applying heat shrink film to cylindrical containers although, as will appear, the invention is also applicable to applying heat shrink film to containers which are not cylindrical in shape and to articles other than containers.

Heretofore apparatus and a method have been provided for applying heat shrink film to cylindrical containers by a series of steps as follows.

1. Heat shrink film is formed into a tube slightly larger in diameter than the container to which it is to be applied.

2. The container is preheated or, if the film application is carried on in conjunction with the manufacture of glass containers, the glass containers can be taken from the glass manufacturing operation while they are still hot or warm. 3. The cylindrical sleeve is placed over the container.

4. The sleeve is then heated to shrink it onto the container.

This procedure is elaborate and expensive. Among its disadvantages are the following.

The film material must be preformed into a cylinder rather than being applied directly from a roll of film material to the containers.

The preformed sleeves, since they are larger in diameter than the containers, must be shrunk in their entirety. This requires more heat for shrinking, both because the entire material of the sleeve must be heat shrunk and because the containers themselves must be heated.

Representative of the method and system referred to above is U.S. Pat. No. 3,822,459, issued Jul. 9, 1974, to Stephen W. Amberg et al, and assigned to Owens-Illinois, Inc.

It is an object of the present invention to provide improvements in the application of sleeves, labels, jackets or the like to containers and other articles, such sleeves, labels or jackets being of heat shrink film.

It is a particular object of the invention to provide apparatus and a method whereby heat shrink film material may be severed into suitable lengths continuously from a roll of the same, applied tightly to containers without heat shrinking and then shrunk onto the containers.

The above and other objects will be apparent from the ensuing description and the appended claims.

One embodiment of the invention is shown by way of example in the drawings, in which:

FIG. 3 is a fragmentary view showing one of the nozzles used for heat shrinking and the manner in which it is blocked at the point where a seam on a heat shrunk label passes by;

FIG. 4 is a similar view at another point where the side seam has passed by the heat shrink station; and FIG. 5 is a diagrammatic view showing a complete labeling assembly.

It will be understood that not only labels but also protective sleeves and jackets may be heat shrunk onto containers and other articles.

Figure 1:
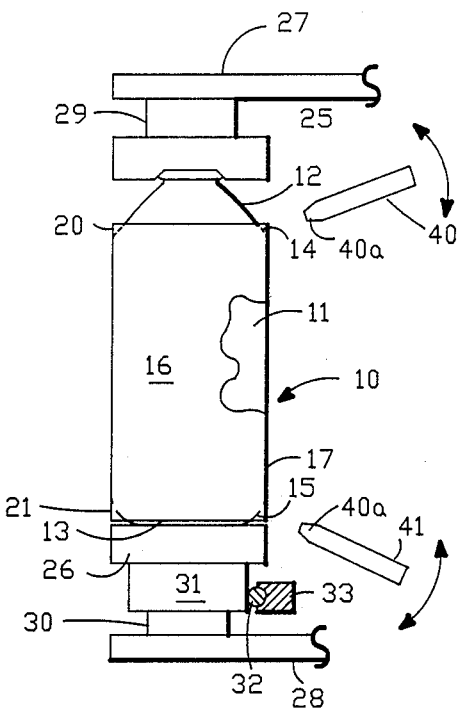
FIG. 1 is a view in side elevation of a pair of chucks mounted on a turret and clamping a cylindrical container onto which a heat shrinkable film is to be shrunk.

Referring now to FIG. 1, a typical cylindrical container is shown and is designated by the reference numeral 10. It comprises a cylindrical body 11, an upper conical shoulder 12, a rounded bottom 13, a shoulder section 14 adjoining the cylindrical body 11 and a section 15 of the rounded bottom 13 adjoining the cylindrical body 11.

The shoulder section 14 and the section 15 are also referred to as "end portions" in that they are at the ends of the body portion 11 and as will be seen they slope inwardly from the outer surface of the cylindrical body portion 11 toward the longitudinal axis of the container. The container 10 may be of glass, metal or plastic, and it is shown as having a heat shrink film 16 applied thereto. The main body portion of this film, indicated by the reference numeral 17 and constituting most of the entire film, is tightly fitted onto the container by a conventional labeling operation such as that shown, for example, in my U.S. Pat. No. 4,108,710. This heat shrinkable film material may be any of a number of materials such as polypropylene, polyethylene and polystyrene foam.

A continuous length of this film material in the form of a roll is provided. (See FIG. 5 and the description below.) It passes continuously through a cutting station where predetermined lengths are severed, the leading end of each severed length is gripped by a vacuum on a constantly rotating vacuum drum and adhesive is applied to the leading end and the trailing end of each label. As shown in my U.S. Pat. No. 4,108,710, a glue line may be applied to the container, the leading end of each label is unglued and is adhered to the container by means of the glue line on the container, and the trailing end of each label is provided with glue and laps over the leading end of the label on the container to form a seam.

It will thus be apparent that the lengths of film are applied to containers by a continuous method as in conventional labeling with, however, the following important differences. A non-heat shrink material such as a paper label would be applied only to the cylindrical part of the container, that is to say, it would not extend over the curved sections 14 and 15 and would be confined to the cylindrical part of the container. In accordance with the present invention, the film or label 16 is not so confined. Instead it projects slightly above and slightly below, e.g. ¼ inch, the cylindrical body portion 11 of the container such that it overlaps the sections 14 and 15 of the shoulder and rounded bottom. If the container or other article to be wrapped has a curvature, i.e. it departs from a cylindrical shape at only one end, then the film will overlap only that end. In the following description and in the drawings it will be assumed that a container is being wrapped which has a rounded bottom and a conical shoulder and that the film will overlap at both the top edge and the bottom edge. The overlap or overlaps are not attached to the container and stand free. That is to say the edge portions of the film segment, which extend between the leading and trailing ends of the segment, overlap but are unattached to the end portions, i.e., the shoulder 14 and the section 15. As will be seen they do not project beyond the top and bottom extremities of the container.

The upper overlap is indicated by the reference numeral 20 and the lower overlap is indicated by the reference numeral 21. These overlaps have an important role in the invention as will be explained below.

Figure 2:
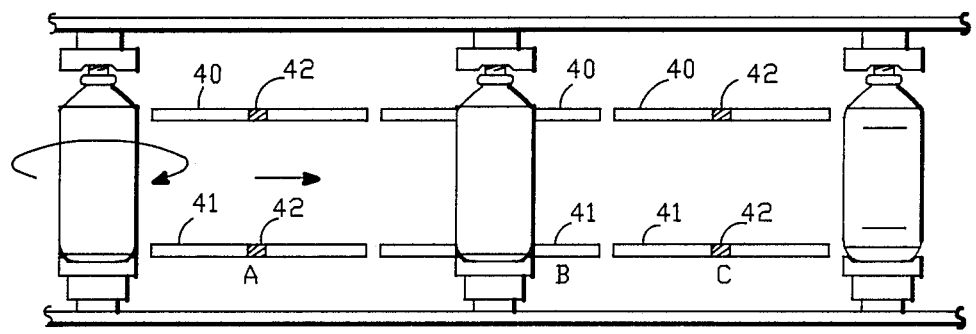
FIG. 2 is a view of three heat shrink stations on a turret.

Also shown in FIG. 1 are upper and lower arms or spokes 27 and 28, respectively, of a turret such as the turret shown in my U.S. Pat. No. 4,108,710 whose function is to transport containers from a container supply through a label applying station and beyond so that labels applied and adhered to the containers by means of glue are wrapped around the containers. An upper chuck 25 and a lower chuck 26 are shown, the upper chuck 25 being rotatably mounted on the upper arm 27 by means of a shaft 29, and the lower chuck 26 being rotatably mounted on the lower arm 28 as by means of a shaft 30. Means are provided such as shown in FIG. 2 of my U.S. Pat. No. 4,108,709 for lifting the upper chuck 25 and holding it in elevated position for entry of a container and for then lowering the chuck 25 to clamp the container between the upper and lower chucks. Further, the lower chuck 26 is positively driven by engagement of a collar 31 on the shaft 30 with a circular, compressible friction member 32 carried by an arcuate holder 33. It will be understood that other means of clamping and spinning containers during transit through the heat shrink station may be employed.

Also shown in FIG. 1 are two nozzles 40 and 41. The upper nozzle 40 has its tip 40A close to and pointed at the upper overlap 20 of the sleeve 16. The lower nozzle 41 has its tip 41A close to and pointed at the lower overlap 21 of the sleeve 16.

Referring now to FIG. 2, three sets of upper and lower nozzles 40 and 41 are shown. For convenience these sets appear to be located in a vertical plane, as they may be, but preferably they are located radially with respect to a turret. As will be seen, the tips of these nozzles are elongated such that, as a container 10 with a sleeve 16 adhered to it passes by and spins about its vertical axis, each portion (with an exception as described below) of the upper overlap 20 and of the lower overlap 21 is exposed to a current of hot air emanating from the nozzles.

The purpose of a plurality of sets of nozzles 40 and 41, e.g. three as in FIG. 2, is as follows: The film material 16 is a relatively limp material. If it is heated too long and too fast, it may deteriorate, undergoing slumping or other distortion of its configuration. Therefore, the heat is delivered in increments at heating stations A, B and C. A portion only of the heat required for shrinking is delivered at station A and the overlaps 20 and 21 undergo a partial but incomplete shrinkage to, for example, the condition shown at station B. At station B a further increment of shrinkage occurs, and at station C the final shrinkage occurs. The overlaps 20 and 21 are shrunk onto the container.

Depending upon the nature and thickness of the film, and possibly upon other factors, it may be possible to accomplish the heat shrinking in one step, in which case there would be only heat shrink station and one pair of nozzles 40 and 41.

Referring now to FIGS. 2 and 3, each nozzle 40 and 41 is provided with an obstruction 42 at a certain point. (Nozzle 40 is shown in FIGS. 3 and 4 but nozzle 41 is similar.) The obstruction 42 in the upper nozzle 40 is in vertical alignment with the obstruction 42 in the lower nozzle 41. As stated above, the containers are caused to spin by frictional engagement of the collar 31 with the rubber friction member 32. A seam 43 is shown in FIG. 3, such being the place where the trailing end 44 of label 16 overlaps the leading end 45 of the label. The leading end is adhered by a layer of glue 46 to the container 10, and the trailing end 44 is adhered to the leading end 45 of the label by a layer of glue 47. FIG. 3 portrays a point in the path of travel of the container and label where the seam 43 is juxtaposed to the nozzles 40 and 41. If hot air is applied too vigorously to this seam the glue will melt and cause smearing and will result in a defective or unsightly sleeve or label. The function of the plug 42 is to prevent or to moderate the flow of hot air at this point in the travel of the container. Since the container is spun at a predetermined rate and is caused to undergo orbital motion at a predetermined rate, the timing is such that when a container reaches a point opposite an obstruction 42, the seam 43 will be juxtaposed to the obstruction.

This timing can be achieved by means well known in the art. The drive roller which supplies the film, the cutter which severs the film into segments, the vacuum drum which picks up segments of film and transports them to the turret, the turret which transports containers and the means for spinning the chucks 25 and 26 are operated continuously by and are timed by well known means so that each segment of film is properly applied to the vacuum drum, glue is applied to the containers and film segment, the container picks up a film segment from the vacuum drum and travels and spins at a predetermined rate such that, among other things, the seam 43 of each film segment or label coincides with a plug or plugs 42.

Referring to FIG. 4, this represents the situation after the seam 43 has passed by. As will be seen, the full current of hot air is applied to the film. The same condition, of course, prevails at all points both before and after the seam reaches the point shown in FIG. 3. Referring now to FIG. 5, a complete assembly, such as a labeling assembly, is shown. It comprises a roll 50 of heat shrink film 51 (e.g. label stock), a drive roller 52 and a pinch roller 53, a cutter 54 and a vacuum drum 55. These elements are of known construction and mode of operation. Other elements not shown may be included, e.g. tensioning means for the label stock 51. A glue applicator 56 of known construction is also shown which applies hot melt glue to the trailing end of each label.

Also shown is a turret 60 rotating about an axis 61 which receives containers 10 from a container feed 65. The turret 60 is provided with pairs of chucks such as those shown at 25 and 26 in FIG. 1. Each container, in turn, is clamped between a pair of chucks and is transported orbitally about the axis 61 of turret 60 and is caused to spin about its own cylindrical axis. A glue line is applied to each container by a glue applicator 66, for example, a glue applicator such as that shown at 53 in FIG. 1 of my U.S. Pat. No. 4,108,710. It will be understood that the various driven elements are coordinated and synchronized to accomplish the desired results.

Each severed label is gripped by vacuum drum 53 and is rotated counterclockwise as viewed in FIG. 5 past a glue applicator 56 which applies glue to the trailing end (and only the trailing end) of each label by virtue of the fact that the trailing end is raised by an elevated portion of the drum such as shown at 173 of FIG. 9 of my U.S. Pat. No. 4,108,710. The label then proceeds to a labeling station 67. The timing is such that the unglued leading end of each label registers with the glue line on the respective container and is adhered thereto by such glue line at which time vacuum is released and the label commences to wrap around the spinning container until the glued trailing end overlaps and is adhered to the leading end of the label. If a partial wrap is to be applied, the glued trailing end will be adhered directly to the container.

A heating station is shown at 68 such as that shown in FIGS. 1 to 4. Shrinking of the ends of the labels is accomplished as described above. Labeled containers 10a are removed by a container out-feed 69.

There are several advantages to the apparatus and system described above, among which are the following:

A single machine, namely the turret 60, serves to transport the containers past glue station 66 where glue is applied to the containers and then past labeling station 67 where the leading end of each label is affixed to the glue line on the container. Then the labels are wrapped about the containers and the ends of the labels are then heat shrunk. This avoids the need to sever label or film material into segments, to form each severed segment into a tube which is oversize in relation to the container, to fit each tube over a container and then to apply heat to the entire label to shrink it onto the container. The equipment required is greatly diminished in size, number of parts and complexity; the operation is faster; the space required is greatly diminished; and the thermal energy required for heat shrinking is considerably reduced.

It will therefore be apparent that novel and advantageous apparatus and method have been provided.

I claim:

1. An article to which a heat shrinkable film has been applied, said article having a top extremity, a bottom extremity, a longitudinal axis between such extremities and a body portion between such extremities which has an outer surface which is parallel to such axis, said article also having at least one end portion between such body portion and an extremity of the article, such portion or portions sloping inwardly from the body portion towards the longitudinal axis, said film being in the form of a segment of heat shrinkable but unshrunken material, said segment having a body portion constituting the major portion of the segment and having a leading end, a trailing end, an upper edge portion and a lower edge portion, said edge portions extending between the leading and trailing ends of the segment but not extending beyond the extremities of the article, said segment being wrapped around the article with its leading end secured to the body portion of the article by adhesive material confined to a narrow region of the film adjacent the leading end and with its trailing end overlapping and secured to the leading end by a narrow region of adhesive material, at least one edge portion of the segment overlapping an end portion of the article but being unattached thereto, such edge portion or portions being free of adhesive at their leading ends said segment being in unshrunken condition and being secured to the article entirely or substantially entirely by the adhesive material at its leading and trailing ends.

2. The article of claim 1 wherein the article is a container.

3. The article of claim 2 wherein the container has upper and lower inwardly sloping end portions and each edge portion of the segment overlaps the respective end portion of the container.

4. The article of claim 3 wherein the container is a cylindrical glass container.

5. The article of claim 3 wherein the container is a cylindrical plastic container.

6. The article of claim 3 wherein the container is a cylindrical metal container.

7. The container of claim 1 in which the adhesive material is hot melt glue.

8. The article of claim 1 wherein the adhesive material which secures the leading end of the segment to the body portion of the article is a pattern of dots.

9. In combination with a non-preheated container defined by first and second extremities and a main body and at least one re-entrant portion between said extremities, an improved wrap shrink label in the form of a non-preheated sheet-like segment of severed film having a main body portion, initially non-heat shrinkably fitted onto said main body, a heat shrinkable edge portion initially freely projecting over said re-entrant portion but not an extremity of said container and leading and trailing end portions juxtaposed permanently adheringly to each other and at least initially to said main body but not said re-entrant portion along a narrow strip of said main body, said narrow strip being narrower than the perimeter of said main body but sufficiently wide to attach the label to said container at least until said edge portion is heat shrunk onto said re-entrant portion, whereby said label is thereafter attached to said container by the heat shrunk edge portion without said edge portion permanently adhering to said re-entrant portion.

10. The combination of claim 9 wherein said container is defined by more than one re-entrant portion comprising shoulders on said container, and said segment has an edge portion of heat shrinkable material overlapping more than one of said re-entrant portions for retaining the label on said container when the edge portions are heat shrunk onto their respective re-entrant portions.

11. The combination of claim 9 wherein the film is foamed polystyrene.

12. The combination of claim 9 including an adhesive to effect the adherence of said end portions to said main body along said narrow strip.

13. The combination of claim 12 wherein said adhesive comprises a line of glue between said main body and the juxtaposed leading and trailing end portions.

14. The combination of claim 12 wherein said adhesive comprises a pattern of dots between said main body and the juxtaposed leading and trailing end portions.

15. The combination of claim 12 wherein said adhesive is initially applied to said main body before the adherence of said end portions thereto.

* * * * *